(12) United States Patent
Lauterbach

(10) Patent No.: US 7,783,786 B1
(45) Date of Patent: Aug. 24, 2010

(54) REPLICATED SERVICE ARCHITECTURE

(75) Inventor: Gary R. Lauterbach, Los Altos Hills, CA (US)

(73) Assignee: Oracle America Inc., Redwood City, CA (US)

( * ) Notice: Subject to any disclaimer, the term of this patent is extended or adjusted under 35 U.S.C. 154(b) by 1279 days.

(21) Appl. No.: 10/801,456

(22) Filed: Mar. 16, 2004

(51) Int. Cl.
 *G06F 15/16* (2006.01)
(52) U.S. Cl. .................. 709/252; 709/238; 709/239
(58) Field of Classification Search ............ 718/1; 709/252, 208
 See application file for complete search history.

(56) References Cited

U.S. PATENT DOCUMENTS

| | | | |
|---|---|---|---|
| 6,633,916 B2 * | 10/2003 | Kauffman | 709/229 |
| 7,299,294 B1 * | 11/2007 | Bruck et al. | 709/235 |
| 2002/0010783 A1 * | 1/2002 | Primak et al. | 709/228 |
| 2004/0049573 A1 * | 3/2004 | Olmstead et al. | 709/224 |
| 2005/0125487 A1 * | 6/2005 | O'Connor et al. | 709/201 |
| 2005/0132362 A1 * | 6/2005 | Knauerhase et al. | 718/1 |
| 2006/0005198 A1 * | 1/2006 | Uchishiba et al. | 718/104 |

\* cited by examiner

*Primary Examiner*—Vivek Srivastava
*Assistant Examiner*—Ryan J Jakovac
(74) *Attorney, Agent, or Firm*—Osha • Liang LLP

(57) ABSTRACT

A system comprising a first node and a second node located in a single multiprocessor system, the first node including a first router and a first replicated service executing on a first operating system, the second node including a second router and a second replicated service executing on a second operating system, and a mesh interconnect connecting the first node to the second node using the first router and the second router.

15 Claims, 4 Drawing Sheets

US 7,783,786 B1

REPLICATED SERVICE ARCHITECTURE

BACKGROUND

The functions of a computer are typically controlled by a central processing unit ("CPU"), commonly referred to as a processor. As processing demands increased, a single processor computer system was no longer considered sufficient. As a result, new computer system architectures evolved to include multiple processors housed within one computer system. FIG. 1 shows such a prior art system architecture.

Typically, a multiprocessor system (100) includes a number of processors (i.e., Processor A (102), Processor B (104), Processor C (106), and Processor D (108)) all connected by an interconnect (110). The interconnect (110) allows the processors (i.e., Processor A (102), Processor B (104), Processor C (106), and Processor D (108)) to communicate with each other. Further, the interconnect (110) allows the processors to interface with a shared memory (112) and access other systems via a router (114).

A multiprocessor operating system (116) is typically used to control the processors (Processor A (102), Processor B (104), Processor C (106), and Processor D (108)). The multiprocessor operating system (116) provides a software platform upon which various services (118), for example, an e-mail server, a web server, a document management system, a database query engine, etc., may execute. More specifically, the multiprocessor operating system (116) receives requests from the various services and forwards the request onto the processors, which generate a response, and returns the response back to the requesting service, via the multiprocessor operating system (116).

Typically, the multiprocessor operating system (116) forwards requests to the processor designated as the master processor (in this example, processor A (102)). The processor designated as the master processor subsequently schedules the request to be processed on one of the other processors (i.e., the slave processors (104, 106, 108)). After the scheduled slave processor has completed processing the request and generated a result, the result is returned to the master processor. The master processor subsequently returns the result, via the multiprocessor operating system, to the requesting service.

SUMMARY

In general, in one aspect, the invention relates to a system comprising a first node and a second node located in a single multiprocessor system, the first node comprising a first router and a first replicated service executing on a first operating system, the second node comprising a second router and a second replicated service executing on a second operating system, and a mesh interconnect connecting the first node to the second node using the first router and the second router.

In general, in one aspect, the invention relates to a system, comprising a first subset and a second subset located in a single multiprocessor system, the first subset comprising a first plurality of nodes and the second subset comprising a second plurality of nodes, wherein each of the first plurality of nodes and each of the second plurality of nodes comprises a router, and a replicated service executing on an operating system, a first mesh interconnect connecting the first subset to the second subset, a second mesh interconnect connecting each node in the first plurality of nodes to every other node in the first plurality of nodes, and a third mesh interconnect connecting each node in the second plurality of nodes to every other node in the second plurality of nodes.

Other aspects of the invention will be apparent from the following description and the appended claims.

DETAILED DESCRIPTION

Figure 1:
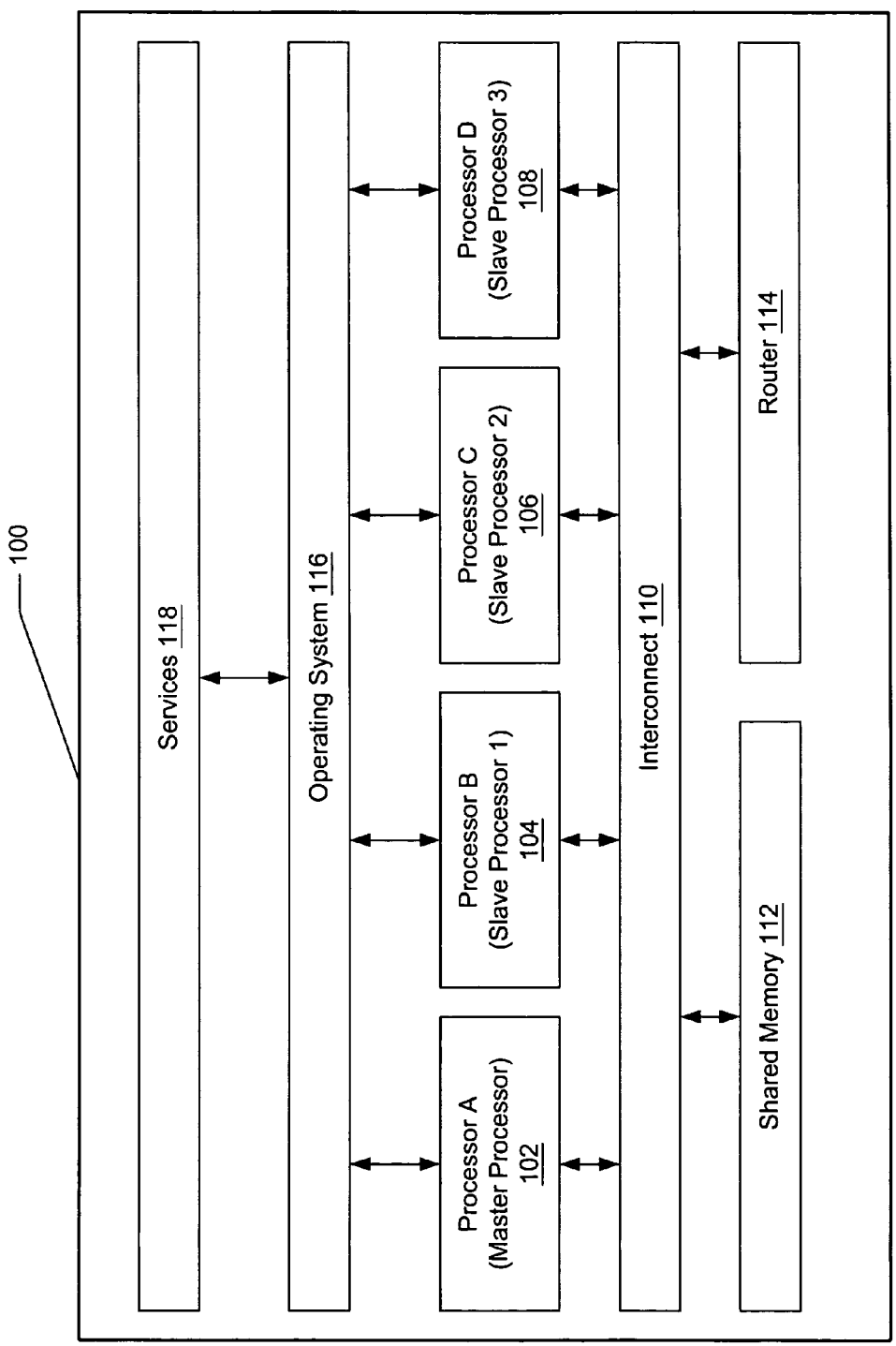
FIG. 1 shows a prior art system architecture.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a system having a replicated service architecture. More specifically, embodiments of the invention provide a multiprocessor system having one or more replicated services executing on two or more nodes. In one embodiment of the invention, the replicated services are used to provide redundancy within the multiprocessor system such that when a first instance of a replicated service fails, the multiprocessor system still has access to a second instance of the replicated service. In this manner, embodiments of the invention enable a multiprocessor system having a replicated service architecture to continue to provide replicated services to a user even when one or more node in the multiprocessor system fail or become unavailable.

Figure 2:
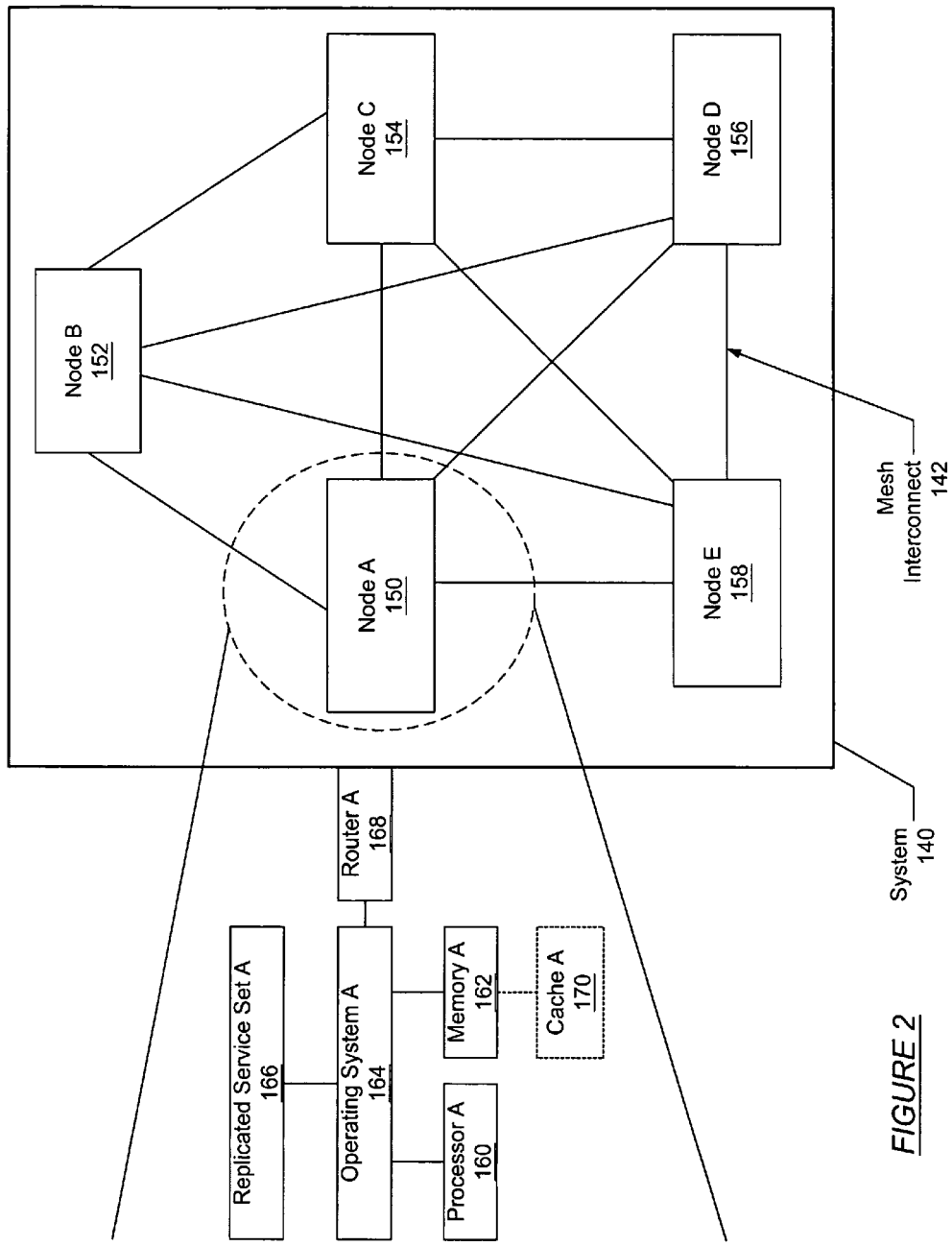
FIG. 2 shows a system in accordance with one embodiment of the invention.

FIG. 2 shows a system in accordance with one embodiment of the invention. More specifically, FIG. 2 shows a multiprocessor system (140) having a node topology in accordance with one embodiment of the invention. In the embodiment shown in FIG. 2, each node (i.e., Node A (150), Node B (152), Node C (154), Node D (156), Node E (158)) in the node topology is connected to every other node. This node topology allows each node multiple communication pathways to communicate with any other node, such that if one or more nodes fail, the remaining nodes may still be able to communicate with one another. In one embodiment of the invention, a mesh interconnect (142) provides the communication hardware infrastructure (i.e., the hardware to physically connect each of the multiple nodes in the node topology) for the node topology used within the system. Those skilled in the art will appreciate that other node topologies may be used that provide multiple communication pathways between each of the nodes in the node topology without requiring every node to be directly connected to every other node, as shown in FIG. 2.

Continuing with the discussion of FIG. 2, the individual components within each node are now described with respect to the exploded view of Node A (150). In one embodiment of the invention, each node includes a processor (i.e., Processor A (160)), an associated memory (i.e., Memory A (162)), an operating system (i.e., operating system A (165) executing on the processor (e.g., Processor A (160)), and one or more replicated services (i.e., Replicated Service A (166)) executing on the node (e.g., 150). Further, the node (e.g., Node A (150)), in one or more embodiments of the invention, interfaces with other nodes in the node topology using a router (i.e., Router A (168)). In addition, in one embodiment of the invention, the node (e.g., Node A (150)) may also include a cache (i.e., Cache A (170)). The aforementioned components in the node (e.g., Node A (150)) provide a means for each individual node to operate independently of the other nodes in the node topology.

In one embodiment of the invention, the hardware (i.e., Processor A (160), Router A (168), Memory A (162), etc.) may be different for each node. For example, Processor A (160) in Node A (150) may be a Complex Instruction Set Computer (CISC) processor while the processor in Node E (158) may be a Reduced Instruction Set Computer (RISC) processor. Further, the operating system for each node may also be different. For example, Node A (150) may be running on a UNIX based operating system such as Solaris™ (Solaris is a trademark of Sun Microsystems, Inc.), while the operating system running on Node C (154) may be a Windows-based operating system such as Windows NT® (Windows NT is a registered trademark of the Microsoft Corporation.)

As described above, each node includes a set of replicated services (e.g., Replicated Service Set A (166)). In one embodiment of the invention, the replicated services correspond to instances of services offered by the system (140). For example, the services may include, but are not limited to, e-mail servers, web servers, a document management system, a database query engine, etc. Thus, in one embodiment of the invention, a given service is said to be a replicated service if more than one instance of the service exists and is available on the system (140). In one embodiment of the invention, an instance of a service corresponds to a given application providing the service. Thus, a service is said to be a replicated service if two different applications executing on different nodes provide the service. For example, for the system (140) in FIG. 2 to have a replicated web service, Node A (150) may run an Apache Web Server while Node B (152) may run an Internet Information Server (IIS)™ (IIS is a trademark of the Microsoft Corporation). Those skilled in the art will appreciate that while Nodes A and B (150 and 152, respectively) were used in the above example, any pair of nodes within the system may host an instance of the replicated service.

Those skilled in the art will appreciate that the term "different application" does not require that the applications providing the replicated service be provided by separate companies or that they are necessarily different products. For example, the "different applications" may be different versions of the same application. Further, the "different applications" may be the same application but one instance is configured to run on a first operating system while a second instance is configured to run on a different operation system. As noted above, in one embodiment of the invention, the inclusion of replicated services allows multiprocessor systems to continue providing services to the multiprocessor system user(s) even when one or more nodes within the multiprocessor systems fails or becomes unavailable.

Continuing with the discussion of FIG. 2, in one embodiment of the invention, the router (168) operates using a lightweight communication protocol that supports sending and receiving broadcast messages (or multicast messages) while not requiring large amounts of overhead (e.g., large headers, etc). Alternatively, the router (168) may use a heavy-weight protocol such Transmission Control Protocol (TCP) and Internet Protocol (IP). Those skilled in the art will appreciate that depending on the node topology, the router (168) may also include an appropriate routing algorithm to allow for communication between the nodes. In addition, the router (168) may include functionality to forward data from one node to another node (e.g., router (168) may include functionality to "pass-through" data received from Node E (158) to Node B (152)). Further, in one embodiment of the invention, the routing protocol is designed to operate without requiring a master node to control the routing within the system, i.e., the router implements a master-less routing policy.

Those skilled in the art will appreciate that bandwidth requirements to allow broadcast messages (or multicast messages) between nodes may vary depending on the choice of node topology and communication protocol. Accordingly, the mesh interconnect (142), and, more specifically, the bandwidth built into the mesh interconnect (142) may vary depending on the aforementioned factors.

As noted above, each node in the system may include a cache (e.g., cache A (170)). In one or more embodiments of the invention, the cache associated with a given node may also include a data structure to provide information about the replicated services provided by the particular node. For example, the data structure may correspond to a table that includes an entry for each replicated service provided by the node. Though not shown in FIG. 2, each node may also include an external I/O port to allow communication with processes and/or devices that are external to the system.

As shown in FIG. 2, the system may include five interconnected nodes. This system, shown in FIG. 2, may be used as a building block for a distributed system in which the system shown in FIG. 2 is one of many subsets of node topologies that make up the larger system. Such a system is shown in FIG. 3.

Figure 3:
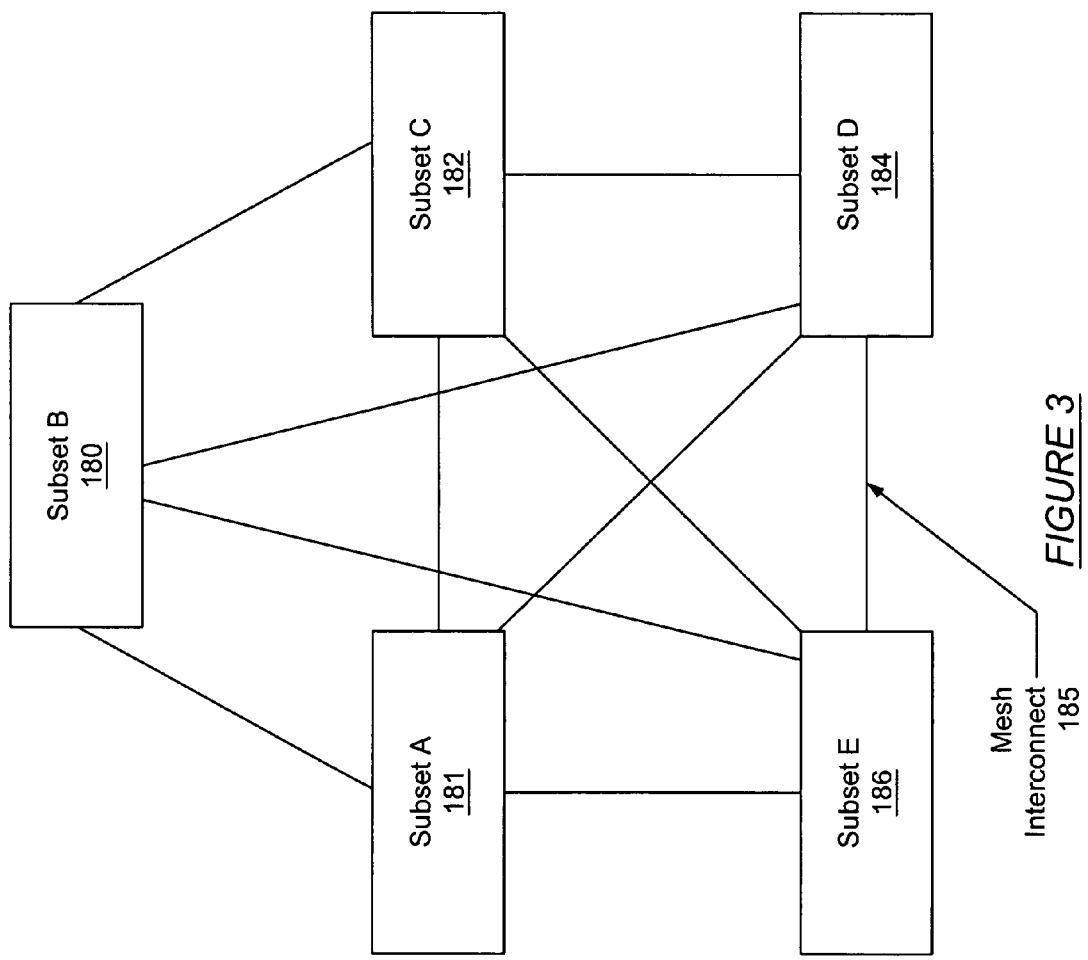
FIG. 3 shows a system in accordance with one embodiment of the invention.

FIG. 3 shows a system architecture in accordance with another embodiment of the invention. The system in FIG. 3 includes a series of interconnected subsets (i.e., subset A (181), subset B (180), subset C (182), subset D (184), subset E (186)) each connected by a mesh interconnect (185). Each of the subsets (181, 180, 182, 184, 186) may be implemented using the same node topology as described in FIG. 2. Alternatively, each subset may have a different node topology. Those skilled in the art will appreciate that while the subset topology shown in FIG. 3 includes a direct connection between each pair of subsets, the invention may be implemented such that each subset has at least two communication pathways (direct or in-direct) to every other subset. Further, those skilled in the art will appreciate that the routing algorithms used by the routers within the individual nodes include functionality to traverse the mesh interconnect of the subsets and functionality to further traverse the other individuals nodes within the subsets.

Figure 4:
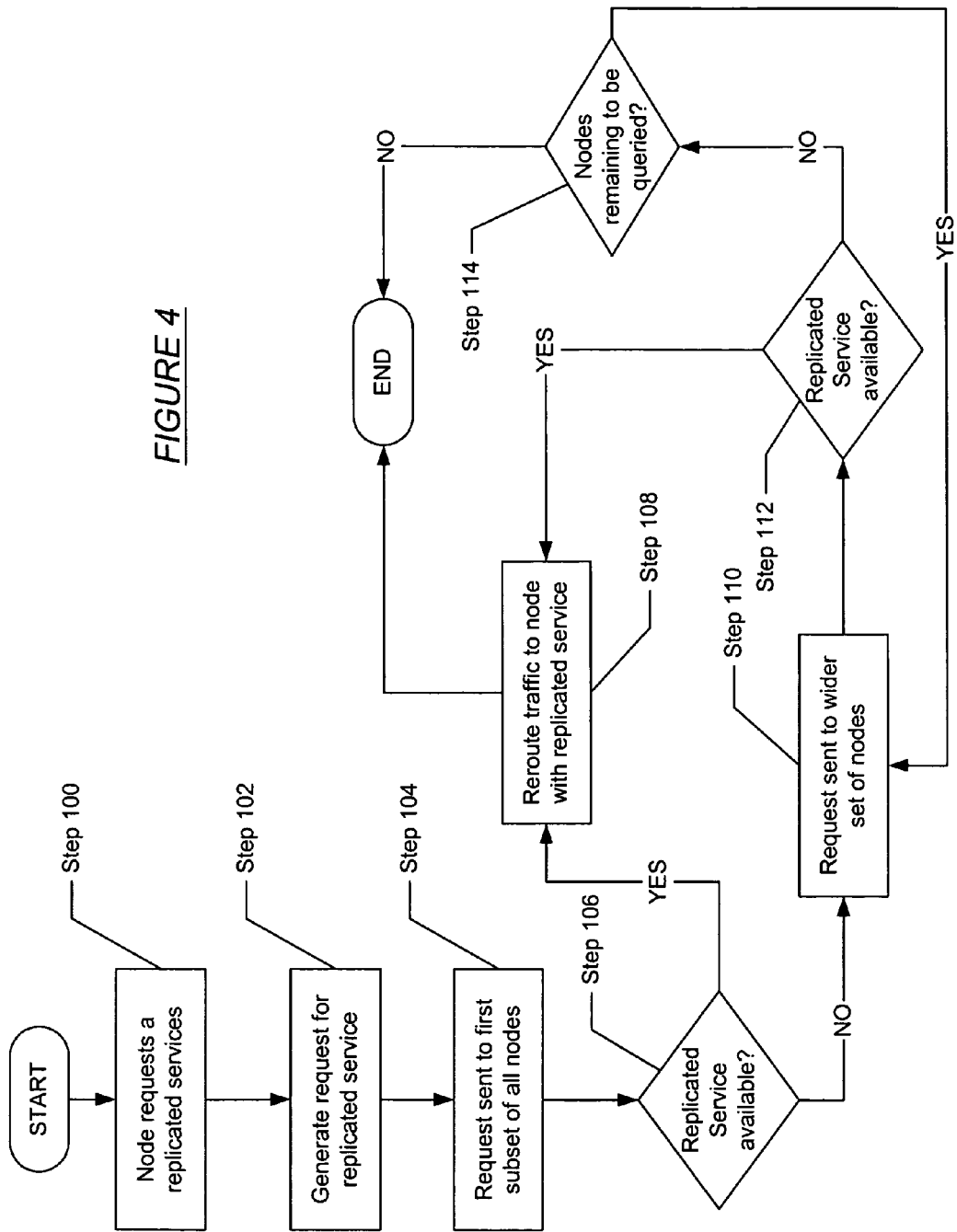
FIG. 4 shows a flow chart in accordance with one embodiment of the invention.

FIG. 4 shows a flow chart in accordance with one embodiment of the invention. Initially, a node requests a replicated service (Step 100). In one embodiment of the invention, the node requests a replicated service because the particular replicated service on the node requesting the replicated service has failed, is busy, or is unavailable for another reason. Additionally, the node may request the replicated service from another node(s) because the node requesting the replicated service does not currently provide the replicated service.

Continuing with the discussion of FIG. 4, the node requesting the replicated service subsequently generates a request for a replicated service (Step 102). Depending on the communications protocol implemented in the multiprocessor system for the node, the request may be a broadcast request (or a multicast request), etc. After the request is generated, the request is subsequently sent to a first subset of nodes (Step 104). In one embodiment of the invention, the first subset of nodes may correspond to the nodes directly connected to the node requiring one or more replicated services. Alternatively, the first subset of nodes may include a set of nodes explicitly specified in the request, regardless of the location within the system. Alternatively, those skilled in the art will appreciate that the first subset of nodes may correspond to any subset of nodes in the multiprocessor system.

Continuing with the discussion of FIG. 4, after the request is sent, the node sending the broadcast message (or a multicast message) subsequently waits to receive a response from each node in the first subset of nodes. The response should indicate whether any one of the nodes in the first subset of nodes has the requested replicated service available (Step 106). In one embodiment of the invention, when a node within the first subset of nodes receives a request for a replicated service from another node, the cache associated with the node receiving the request is examined. If the replicated service is listed in the cache, then a response is sent to the node that sent the request. The response indicates the availability of the replicated service. Those skilled in the art will appreciate that, in some instances, if the replicated service is not listed in the associated cache, the node receiving the request (via the operating system), may query the replicated services on the node that received the request prior to responding to the request.

Alternatively, if the node receiving the request does not include an associated cache, then when a request for a replicated service is received, the node queries the replicated services currently executing on the node and determines whether any of the replicated services executing on the node correspond to the replicated services being requested. If a replicated service corresponding to the requested replicated service is present, then the node generates and sends a response to the node that requested the replicated service. The response indicates the presence/availability of the replicated service.

Continuing with the discussion of FIG. 4, if the requested replicated service is found executing on any one of the first subset of nodes, then all subsequent requests for the replicated service are re-routed to the node that includes the replicated service (Step 108). Thus, referring to FIG. 2, if the Node A (150) requested a particular replicated service and, via the aforementioned method, determines that Node B (152) includes that replicated service, then all subsequent requests to Node A (150) for the particular replicated service are re-routed to Node B (152).

However, if the requested replicated service is not present in the first subset of nodes, then a subsequent request (similar to one described above in Step 102) is generated and broadcast (via a broadcast or a multicast message) to a wider set of nodes (Step 110). The node that sent the broadcast message (or multicast message) subsequently waits to receive a response indicating whether or not any one of the wider set of nodes includes the requested replicated service, as described with respect to Step 106 (Step 112). If the requested replicated service is found executing on the any one of the wider subset of nodes, then the node proceeds to performs the actions described above with respect to Step 108.

Alternatively, if the replicated service is not found, then the node requesting the replicated service determines whether any remaining nodes exist requiring a query (step 114). If there are additional nodes to query, then the node requiring the replicated service proceeds to perform the actions associated with Step 110. Alternatively, if there are no remaining nodes to query, the node halts sending any other messages. At this stage, if the replicated service is not available on any of the nodes, then node requesting the replicated service may wait for a period of time and repeat steps 100-114. Alternatively, the request to obtain replicated services may fail.

Those skilled in the art will appreciate that a give node may also not respond to a request for a replicated service if the node is heavily loaded or overloaded. Accordingly, embodiments of the invention may also be applied to load balancing in multiprocessor system.

As mentioned above, in one or more embodiments of the invention, the routers within the individual nodes include functionality to re-route network traffic from one node to another. Further, each node includes functionality to determine the status of any node in the system and to re-route the network traffic of any node in the system. Thus, if a given node fails, the remaining nodes in the system are able to ascertain this fact and re-route network traffic to the remaining nodes, accordingly. Those skilled in the art will appreciate that the aforementioned functionality does not require a master processor. Rather, each node co-operates with the other nodes such that all the network traffic is re-routed to the appropriate nodes.

In one embodiment of the invention, all nodes within the multiprocessor system are governed by a set of rules that dictate how traffic is to be re-routed when a given node fails. These may be built into the nodes via software and/or hardware. Thus, when a given node fails, the remaining nodes, using the set of rules, are able to successfully re-route the network traffic without requiring a master node/processor.

The following example is included to illustrate potential uses of the invention. The examples are not intended to limit the scope of the application or the potential uses of the invention. In one embodiment, the invention involves a means to continue providing services when certain operating systems and instances of replicated services are unavailable. For example, consider the scenario in which a particular computer virus is designed to exploit a security flaw in a particular operating system; however, other operating systems without this flaw are unaffected.

In this scenario, a multiprocessor system (without replicated services and different operating systems) would be vulnerable to such a computer virus if the only operating system running on the multiprocessor system was targeted by the virus. However, the presence of different operating systems, replicated services, and isolated nodes provide a counter measure to offset the vulnerability of operating systems and replicated services to such a virus. Thus, even if one of the nodes in the multiprocessor system, designed in accordance with the present invention, is vulnerable and fails in response to the virus, the services provided by the failed node may continue to be available at a different node running a different operating system, which is not vulnerable to the virus.

Thus, if one of the nodes fails, the processing being performed on the failed node may be re-routed to an unaffected node. In this manner, the present invention provides a robust redundant system to provide services even when one or more nodes fail. Similar benefits may also be seen in the area of Internet security where hackers may exploit certain security holes present in a given application or operating system. Similar to the virus scenario, the nodes that are executing operating systems or replicated services, which are resulting in a security breach may be "turned off" and the workload that the affected nodes were performing may be off loaded to the unaffected nodes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
a plurality of nodes housed within a single computer having a plurality of processors, wherein the plurality of nodes comprises a first subset of nodes having a first node and a second subset of nodes having a second node; and
a mesh interconnect, located within the single computer, connecting the plurality of nodes,
wherein the first node comprises a first router for interfacing with the plurality of nodes using the mesh interconnect and a first replicated service executing on a first operating system of the first node,
wherein the second node comprises a second router for interfacing with the plurality of nodes using the mesh interconnect and a second replicated service executing on a second operating system of the second node, and
wherein the first node is configured to:
generate, in response to the first replicated service being unavailable, a first request to replace the first replicated service, wherein the first request specifies the first subset of nodes,
send the first request to replace the first replicated service to the first subset of nodes using the mesh interconnect,
generate, after determining the first subset of nodes does not comprise a replacement for the first replicated service, a second request to replace the first replicated service, wherein the second request specifies the second subset of nodes,
send the second request to replace the first replicated service to the second subset of nodes using the mesh interconnect,
receive a response to the second request from the second node indicating the second node comprises a replacement for the first replicated service,
receive, after receiving the response from the second node, a request for the first replicated service from a third node of the plurality of nodes, and
route, based on the response and using a master-less routing policy implemented by the first router, the request for the first replicated service from the third node to the second node.

2. The system of claim 1, wherein the second node comprises a cache indicating that the second replicated service is available, and wherein the second node is configured to generate the response based on the cache.

3. The system of claim 1, wherein the first router comprises a lightweight communications protocol.

4. The system of claim 1, wherein the first router comprises a heavy-weight communications protocol.

5. The system of claim 1, wherein the mesh interconnect provides at least two connection paths from the first node to the second node.

6. The system of claim 1, wherein the first replicated service is a different application than the second replicated service.

7. The system of claim 1, wherein the first node is configured to send the first request using at least one selected from a group consisting of a broadcast message and a multicast message.

8. The system of claim 2, wherein the cache comprises a table having entries for each replicated service provided by the second node.

9. The system of claim 1, wherein the first replicated service is unavailable when the first replicated service is busy.

10. The system of claim 1, wherein the first replicated service is unavailable when the first replicated service has failed.

11. The system of claim 10, wherein the first replicated service has failed due to a security hole being exploited by a hacker, and wherein the second replicated service does not include the security hole.

12. The system of claim 1, wherein the first operating system is different than the second operating system.

13. A method for managing replicated services, comprising:
generating, by a first node selected from a plurality of nodes, a first request to replace a first replicated service of the first node when the first replicated service is unavailable, wherein the plurality of nodes comprises a first subset of nodes including the first node and a second subset of nodes, wherein the first request specifies the first subset of nodes, and wherein the plurality of nodes is housed within a single computer having a plurality of processors and connected using a mesh interconnect;
sending, by the first node, the first request to the first subset of nodes using the mesh interconnect;
generating, after determining the first subset of nodes does not comprise a replacement for the first replicated service, a second request to replace the first replicated service, wherein the second request specifies the second subset of nodes,
sending, by the first node, the second request to replace the first replicated service to the second subset of nodes using the mesh interconnect,
receiving, at the first node, a response from a second node of the second subset of nodes indicating the second node comprises a replacement for the first replicated service;
receiving, at the first node and after receiving the response from the second node, a request from a third node of the plurality of nodes for the first replicated service; and
routing, at the first node using a master-less routing policy implemented by a router of the first node, the request from the third node to the second node based on the response.

14. A system comprising:
a first node of a first subset of nodes comprising a first router, and a first application executing on a first operating system for performing a replicated service;
a second node of a second subset of nodes comprising a second router, a second application executing on a second operating system for performing the replicated service, and a cache table having an entry indicating an availability of the replicated service on the second node; and
a mesh interconnect connecting the first subset of nodes and the second subset of nodes,
wherein the first node is configured to:
generate, in response to the replicated service being unavailable, a first request to replace the replicated service, wherein the first request specifies the first subset of nodes,
send the first request to replace the replicated service to the first subset of nodes using the mesh interconnect,
generate, after determining the first subset of nodes does not comprise a replacement for the replicated service, a second request to replace the replicated service, wherein the second request specifies the second subset of nodes, send the second request to replace the replicated service to the second subset of nodes using the mesh interconnect, receive a response to the second request from the second node indicating the second node comprises a replacement for the replicated service, receive, after receiving the response from the second node, a third request for the replicated service from a third node, and route, based on the response and using a master-less routing policy implemented by the first router, the third request for the replicated service from the third node to the second node, wherein the second node is configured to examine the entry in the cache based on the second request to replace the service, and send the response to the first node using the mesh interconnect, wherein the first node, the second node, the third node, and the mesh interconnect are housed within a single computer having a plurality of processors, and wherein the first application is different than the second application.

15. The system of claim 14, wherein the second application has failed due to a security hole being exploited by a hacker, and wherein the first application does not include the security hole.

* * * * *